(12) United States Patent
Elmouttie et al.

(10) Patent No.: US 12,546,908 B2
(45) Date of Patent: Feb. 10, 2026

(54) ROCK FALL ANALYSER

(71) Applicant: Commonwealth Scientific and Industrial Research Organisation, Acton (AU)

(72) Inventors: Marc Elmouttie, Acton (AU); Xun Luo, Acton (AU); Peter Dean, Acton (AU); Joey Duan, Acton (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 413 days.

(21) Appl. No.: 18/017,067

(22) PCT Filed: May 28, 2021

(86) PCT No.: PCT/AU2021/050529
§ 371 (c)(1),
(2) Date: Jan. 19, 2023

(87) PCT Pub. No.: WO2022/027082
PCT Pub. Date: Feb. 10, 2022

(65) Prior Publication Data
US 2023/0296798 A1 Sep. 21, 2023

(30) Foreign Application Priority Data
Aug. 5, 2020 (AU) ................................ 2020902756

(51) Int. Cl.
*G01V 1/22* (2006.01)
*G06T 7/277* (2017.01)
(Continued)

(52) U.S. Cl.
CPC ............. *G01V 1/226* (2013.01); *G06T 7/277* (2017.01); *G06T 7/70* (2017.01); *H04N 7/188* (2013.01);
(Continued)

(58) Field of Classification Search
CPC .......... G01V 1/226; G01V 1/288; G01V 1/30; G01V 2210/74; G06T 7/277; G06T 7/70;
(Continued)

(56) References Cited

U.S. PATENT DOCUMENTS

| 9,031,791 B2 | 5/2015 | Nedilko et al. | |
| 2012/0183004 A1* | 7/2012 | Kupershmidt | H01S 5/0687 |
| | | | 372/29.011 |

(Continued)

FOREIGN PATENT DOCUMENTS

| CN | 103824422 A | * | 5/2014 |
| CN | 108896046 A | * | 11/2018 |

(Continued)

OTHER PUBLICATIONS

Fausto Guzzetti, "Stone: a computer program for the three-dimensional simulation of rock-falls", Computers and Geosciences 28, 2002, pp. 1079-1093 (Year: 2002).*

(Continued)

*Primary Examiner* — Catherine T. Rastovski
*Assistant Examiner* — Yossef Korang-Beheshti
(74) *Attorney, Agent, or Firm* — Paul Teng (57) ABSTRACT

This disclosure relates to analysing rock falls. A video camera captures video data, a depth measurement system captures depth data, a seismic sensor captures seismic data, and a data store stores spatial characterising data of the rock fall site. A processor detects a rock fall source location based on the video data, depth data, seismic data; determines a three-dimensional free fall estimation based on the rock fall source location; estimates three-dimensional bounce kinematics based on the three-dimensional free fall estimation and the spatial characterising data of the rock fall site; estimates a runout based on the rock fall source location, free fall and bounce kinematics; and combines the rock fall (Continued)

source location, the three-dimensional free fall, the three dimensional bounce kinematics and the runout to determine a rock fall trajectory.

20 Claims, 3 Drawing Sheets

(51) Int. Cl.
*G06T 7/70* (2017.01)
*H04N 7/18* (2006.01)

(52) U.S. Cl.
CPC .............. *G06T 2207/10016* (2013.01); *G06T 2207/30181* (2013.01)

(58) Field of Classification Search
CPC . G06T 2207/10016; G06T 2207/30181; G06T 17/00; H04N 7/188
See application file for complete search history.

(56) References Cited

U.S. PATENT DOCUMENTS

2015/0285927 A1* 10/2015 Nedilko .................. B61K 9/08 73/645
2016/0191163 A1* 6/2016 Preston .................. G01L 1/242 398/16

FOREIGN PATENT DOCUMENTS

| CN | 109345776 A | * | 2/2019 |
| CN | 209741868 U | | 12/2019 |
| CN | 111737871 A | | 10/2020 |
| JP | H09280906 A | * | 10/1997 |

OTHER PUBLICATIONS

Malte Voge, "Installation of a Doppler Radar Monitoring System at Merapi Volcano, Indonesia", IEEE Transactions on Geoscience and Remote Sensing, vol. 47, Jan. 2009 (Year: 2009).*
Written Opinion of the International Searching Authority dated Jun. 28, 2021 in connection with PCT/AU2021/050529.
International Search Report dated Jun. 28, 2021 in connection with PCT/AU2021/050529.
International-type search report dated Jan. 22, 2021 in connection with Australian Application No. 2020902756.
Macciotta et al., "Preliminary approach for prioritizing resource allocation for rockfall hazard. Investigations based on susceptibility mapping and efficient three-dimensional trajectory modelling", Bulletin of Engineering Geology and the Environment (2019) 78:2803-2815.
Irfan et al., "Segmented Loop Algorithm of Theoretical Calculation of Trajectory of Rockfall",Geotechnology Geology Engineering, (2017) 35:377-384.
Guzzetti et al., "Stone: a computer program for the three-dimensional simulation of rock falls", Computers & Geosciences 28 (2002) 1079-1093.
Ashfield, James Richard (2001) The computer simulation and prediction of rock fall, Durham theses, Durham University. Available at Durham E-Theses Online: http://etheses.dur.ac.uk/4383/.

* cited by examiner

ROCK FALL ANALYSER

CROSS-REFERENCE TO RELATED APPLICATIONS

The present application is a Section 371 of PCT/AU2021/05029 filed May 28, 2021, claiming priority from Australian Provisional Patent Application No 2020902756 filed on Aug. 5, 2020, the contents of each of which are incorporated herein by reference in their entirety.

TECHNICAL FIELD

This disclosure relates to calculating trajectories of rocks during a rock fall event.

BACKGROUND

Rock falls are a significant concern for civil engineering and mining projects where operations may be disrupted or infrastructure damaged by rock falls from a rock fall site, such as a mining wall or a face or slope of a mountain.

A variety of rock fall monitors detect rock falls or detect rocks themselves on railway tracks, for example. However, these monitors only indicate that a rock fall event occurred but do not provide sufficient details for designing and operating projects optimally.

Therefore, there is a need for an improved rock fall system that not only monitors rock falls but also analyses rock falls to provide more accurate and diverse data than existing rock fall monitors.

SUMMARY

It is typically difficult to observe a three-dimensional trajectory of a rock fall in the field. This disclosure provides a method of sensor fusion where a combination of radar and video systems provide information about the movement of the rock as it falls. A seismic sensor detects bounce events where the rock bounces off the wall and interacts with the ground. This enables the correction of the sensor fusion by using stored data about the wall shape and material composition to improve the accuracy of the fusion method.

A method for analysing rock falls comprises capturing video data of a rock fall site; capturing depth data of the rock fall site; capturing seismic data of the rock fall site; storing spatial characterising data of the rock fall site; detecting a rock fall source location of a rock fall based on the video data, depth data, seismic data; determining a three-dimensional free fall estimation of the rock fall based on the rock fall source location; estimating three-dimensional bounce kinematics of the rock fall based on the three-dimensional free fall estimation and the spatial characterising data of the rock fall site; estimating a runout based on the rock fall source location, free fall and bounce kinematics; and combining the rock fall source location, the three-dimensional free fall, the three dimensional bounce kinematics and the runout to determine a rock fall trajectory.

It is an advantage that the method determines a full rock fall trajectory that combines the rock fall source, free fall, bounce kinematics and runout of the rock fall. As a result, the method provides detailed information about rock falls on the rock fall site, which enables optimisation of projects at the rock fall site.

The method may further comprise triggering the steps of the method based on a likelihood of detection of a rock fall source of a rock fall. Triggering may be sensitive to video data, depth data, and seismic data. The method may further comprise capturing low frame rate video data before the triggering and capturing high frame rate video data in response to the triggering. The triggering may use spatial adjustments for regions of the rock fall site.

The spatial adjustments may be based on one or more of a geological model, a rock mass defect, rock quality, a hazard.

Estimating the three-dimensional free fall may comprise fusing line of sight data from the depth data and perpendicular to line of sight data from the video data.

The spatial characteristics may comprise one or more of surface topography, and surface stratigraphy.

Determining the three-dimensional bounce kinematics may be performed in response to detecting a rock impact based on the seismic data.

Detecting the rock impact may comprise determining an impact location of the rock impact, and estimating the three-dimensional bounce kinematics may be based on the spatial characterising data at the impact location.

Determining the rock fall trajectory may comprises determining rock fall motion based on the video data and the radar data used in a motion estimation method, and updating the motion estimation method in response to detecting the rock impact with the three-dimensional bounce kinematics.

The motion estimation method may be based on a Kalman filter.

The method may comprise alternating between determining the three-dimensional free fall estimation, detecting an impact event, estimating three-dimensional bounce kinematics, and determining a further three dimensional free fall estimation based on the three-dimensional bounce kinematics.

Estimating the runout may be based on ground topography.

The method may further comprise initiating a mitigation action for a location in response to determining that the trajectory of the rock fall impacts the location.

The mitigation action may comprise one or more of an alarm and vehicle control.

A system for analysing rock falls comprises a video camera to capture video data of a rock fall site; a depth measurement system to capture depth data of the rock fall site; a seismic sensor to capture seismic data of the rock fall site; a data store to store spatial characterising data of the rock fall site; and a processor configured to:
   detect a rock fall source location of a rock fall based on the video data, depth data, seismic data;
   determine a three-dimensional free fall estimation of the rock fall based on the rock fall source location;
   estimate three-dimensional bounce kinematics of the rock fall based on the three-dimensional free fall estimation and the spatial characterising data of the rock fall site;
   estimate a runout based on the rock fall source location, free fall and bounce kinematics; and
   combine the rock fall source location, the three-dimensional free fall, the three dimensional bounce kinematics and the runout to determine a rock fall trajectory.

The depth measurement system may be a radar system or a range finder system.

The depth measurement system may define a line of sight and the video camera is configured to capture image data in a plane that is perpendicular to the line of sight.

The seismic sensor may be a fibre-optic sensor comprising an optical fibre.

Optional features disclosed in relation to the method or system, are equally optional features of the other aspects of this disclosure.

BRIEF DESCRIPTION OF DRAWINGS

An example will now be described with reference to the following drawings.

DESCRIPTION OF EMBODIMENTS

Rock Fall Analysis System

Figure 1:
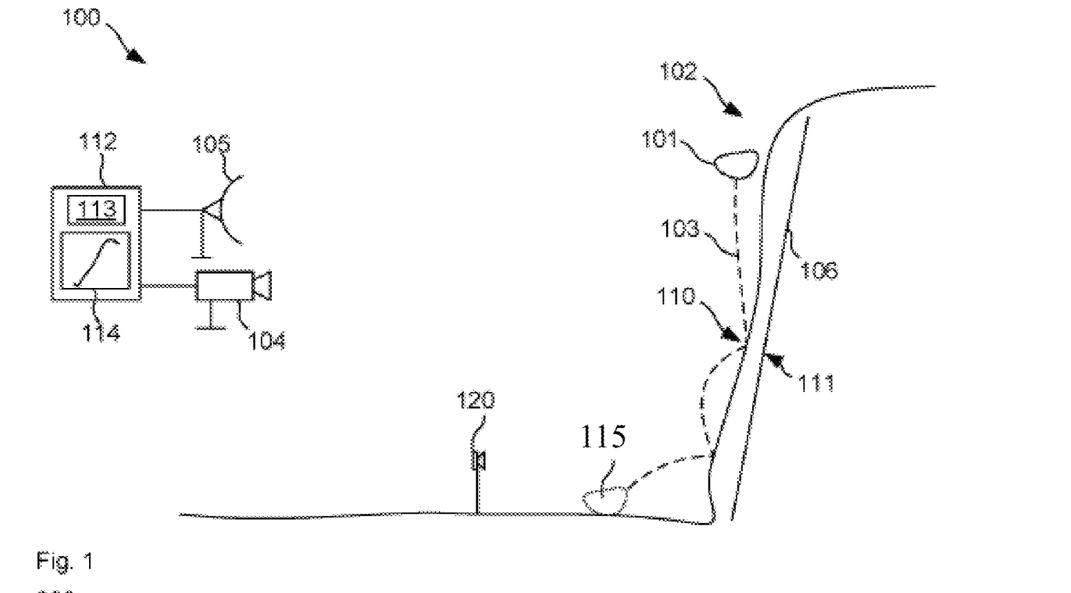
FIG. 1 illustrates a system for analysing rock falls of a rock on a rock fall site.

FIG. 1 illustrates a system 100 for analysing rock falls of a rock 101 on a rock fall site, which is a rock wall 102 in this example. System 100 is referred to as an 'analysis' system as it not only detects rock fall events, but analyses these events in the sense that system 100 calculates a trajectory of the rock 101. System 100 fuses a variety of sensors to estimate the trajectory 103 of rock 101. More particularly, system 100 comprises one or more video cameras 104 to capture video data of a rock wall 102, one or more radar systems 105 to capture radar data of the rock wall 102. While examples provided herein relate to radar data, other depth data may equally be used, such as from a laser range finder system that generates a point cloud in three dimensions. The video camera 104 and radar system 105 may or may not be co-located. In the latter case of cameras and/or radar systems not being co-located, system 100 applies appropriate coordinate transformations to register the camera and radar data. System 100 further comprises a seismic sensor 106 to capture seismic data of the rock fall site. Since rock impacts generate a significantly smaller seismic event than other naturally occurring events, such as earthquakes, the events considered herein are also referred to as "microseismic events".

In one example, the seismic sensor 106 is a fibre-optic seismic sensor, which comprises an optical fibre, a light source, such as a laser, and a detector. Impurities in the fibre or a purposely placed fibre Bragg grating, create backscattered light and vibrations in the fibre cause a phase shift in the backscattered light. By detecting that phase shift, it is possible to locate vibrations along the sensor 106. So in the example of FIG. 1, the seismic sensor 106 is distributed vertically, which means the optical fibre extends from the bottom of rock wall 102 to the top. As a result, the seismic sensor 106 can detect the location of a vibration, as caused by rock 101 impacting on rock wall 102. It is noted that the seismic sensor 106 may be connected to a further computer system (not shown), which receives the seismic data, stores it and provides it to other computer systems for processing.

For the example trajectory 103, rock 101 impacts the rock wall 102 at impact location 110. Accordingly, seismic sensor 106 detects a vibration at multiple sensor locations, such as location 111. It is noted that other sensor configurations are possible, such as horizontal placements, surface placements or buried placements or grids of fibres. Further, other seismic sensor such as geophones could equally be used.

System 100 further comprises a computer 112 comprising a processor 113 and a data store 114 to store spatial characterising data of the rock fall site. For example, the spatial characterising data may be a three-dimensional profile of the rock wall 102, such as a block model of a mine site.

In one example, seismic, video and radar data are synchronized in time, such as by providing a time stamp to each captured radar and video image as well as each impact or phase shift signal from the seismic sensor 106. One example of synchronization of the data is that each system (radar, video, seismic) comprises an external source of a global time reference and includes that reference as a time stamp to all measurements. The global time reference may be a global positioning system (GPS) or a network time protocol (NTP) client. In other examples, a timing system sends a synchronization signal locally so that video, radar and seismic systems receive the synchronization signal and can synchronize their data capture accordingly.

Figure 2:
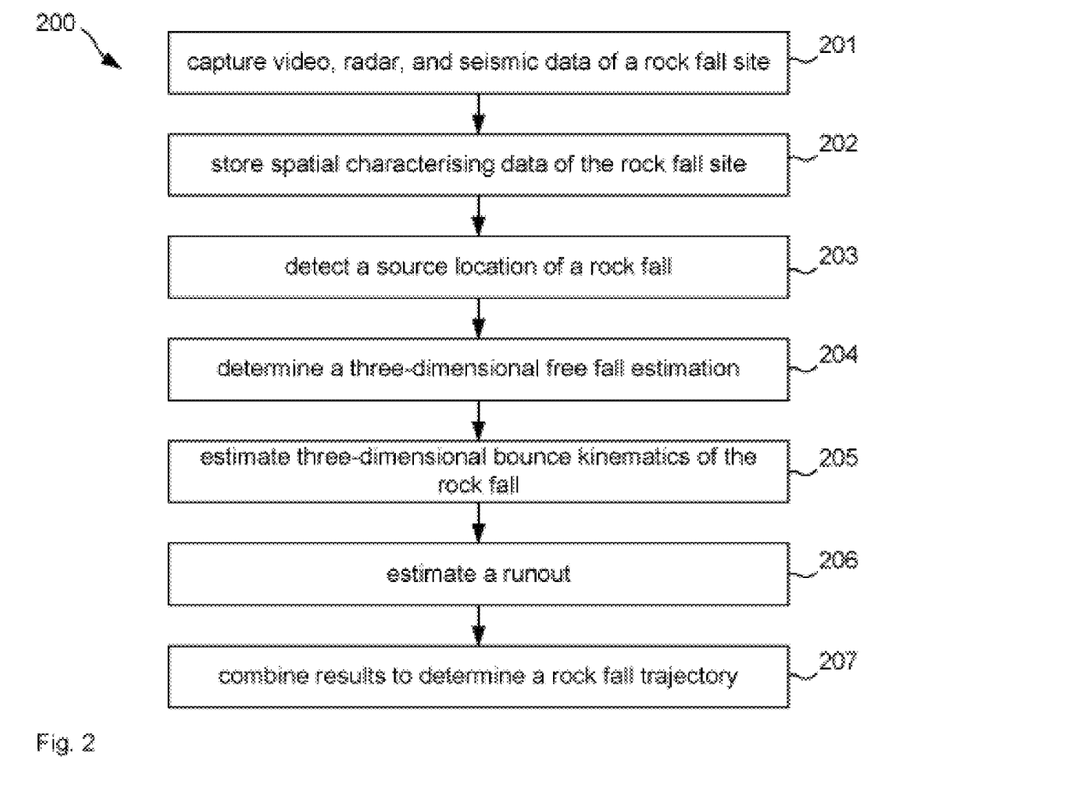
FIG. 2 illustrates a method for analysing rock falls.

Processor 113 is configured to perform a method for analysing rock falls as illustrated in FIG. 2, in the sense that processor 113 detects a source location, estimates free-fall, estimates bounce kinematics, a runout and combines the results to determine the rock fall trajectory 103 ending at a resting location 115.

The video camera may be a Nikon D800e and AF-S NIKKOR 800 mm f/5.6E FL ED VR 35.9 mm×24 mm Nikon FX format 7,360×4,912 pixels. The range to target may be 1000 metres. The radar system 105 may be the IDS IBIS radar system or the GroundProbe SSR radar system. In further examples, the radar system 105 has a sampling rate of 5 to 50 Hz and a field of view of 80 degrees (horizontal)× 40 degrees (vertical). The seismic sensor 10 may be Silixa iDAS™.

Applications

There may be a number of practical uses for the determined rock fall trajectory 103. For example, there may be an alarm system 120 installed under rock wall 102, which can sound an alarm in real-time for the areas that are likely affected by the rock fall event, that is, areas in which the trajectory 103 ends. In that case, the calculation of the trajectory is essentially a prediction of the actual rock fall event. Other options include automatic mitigation of damage or injuries, including vehicle control, such as applying emergency brakes of a train that is about to enter an area covered by trajectory 103, or by engaging protective shielding to cover windows of vehicles. Since the trajectory is determined in three dimensions, the 3D trajectory provides more targeted identification of which zone at the base of the slope is at risk.

Figure 3:
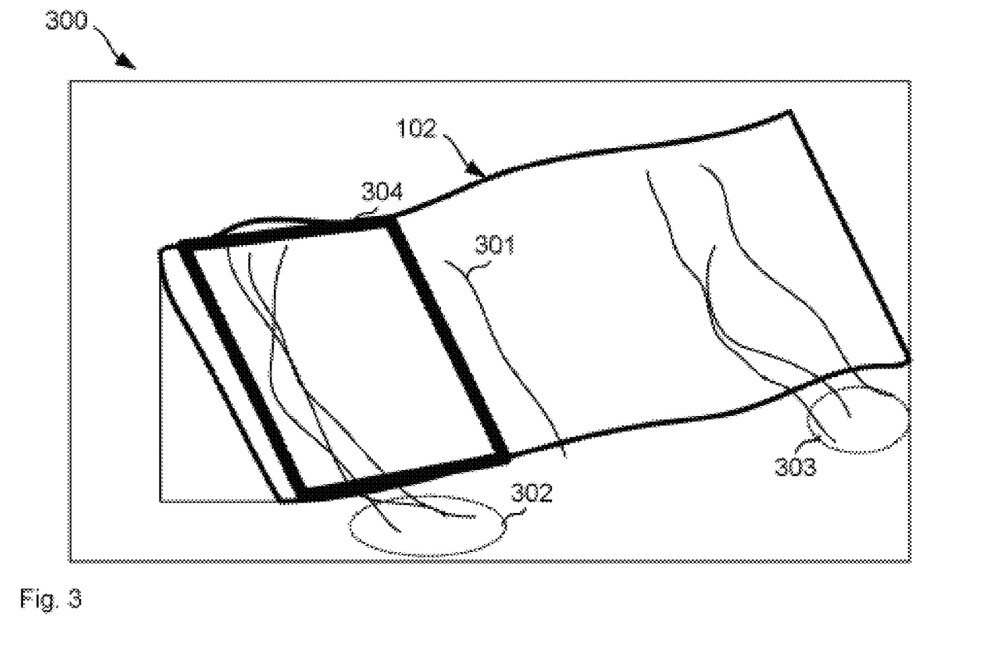
FIG. 3 illustrates a graphical output showing multiple trajectories of rock falls.

FIG. 3 illustrates a graphical output 300 that processor 113 may generate. The graphical output 300 in this case is a three-dimensional image of rock wall 102. Along the slope of the rock wall 102 the image 300 shows a number of trajectories, such as example trajectory, shown as traces on the image 300. It can be seen that a number of trajectories are concentrated at either ends of the wall 102, which defines two hotspots 302, 303, respectively. Processor 113 may automatically determine these hotspots by calculating a density of trajectories in a particular areas. That is, processor 113 may not only calculate the final location of the fallen rock, but also consider the areas that are traversed by the trajectory. This way, a more accurate risk value can be estimated for the risk of being impacted by a rock fall event.

In one example, the entire area is divided into pixels or three-dimensional voxels, and for each pixel/voxel processor 113 maintains a risk score. Processor 113 increments the risk score for each time a trajectory crosses that pixel/voxel.

To that end, each trajectory may be considered to have a width or thickness to cover a large number of pixels/voxels. A hotspot (e.g., 301) is then defined as a contiguous area with a risk value above a particular threshold, such as 5 trajectories within one week. Processor 113 may also access a block model of a mine site and update blocks with a risk score indicative of the number of trajectories that impinge on each block.

Image 300 also shows a danger zone 304, which is defined on rock wall 102. Processor 113 may also calculate this zone automatically by calculating the number of trajectories within that zone.

With the trajectories and in particular, the image 300, at hand, a user can design improved stand-off/exclusion zones based on more accurate analysis of rock fall sources and final runouts. Further, the calibration of rock fall simulators can be improved based on more accurate analysis of source location, bounce impact locations and runouts.

Method for Analysing Rock Falls

As mentioned above, FIG. 2 illustrates a method 200 for analysing rock falls, which may be implemented in computer 112. In that sense, the steps in method 200 are written as software code, compiled and stored on program memory. Processor 113 then retrieves the compiled software code and executes it, which causes processor 113 to perform method 200. Essentially, processor 113 uses the fused vision, radar and micro-seismic system for estimation of locations and timing of rock fall sources, impacts (including energy), and run out location. Further sensors may also be included in the fusion, including infra-red, which may further constrain the problem.

First, processor 113 captures 201 video, radar and seismic data of the rock fall site 102. Capturing may comprise controlling or activating the video camera 104, radar system 105 and seismic sensor 106 or simply receiving the data from these inputs. Capturing may also mean retrieving previously generated data from computer memory.

The radar data may be in the form of statistical mean x and standard deviation σ estimates of range ($x_r$, $\sigma_r$) and may be created from a radar scan, that is, a narrow beam of radiation scanning the wall 102 and processor 113 creating a composite two- or three-dimensional depth image.

The video data may be in the form of statistical mean x and standard deviation σ estimates of image plane position ($x_v$, $\sigma_v$), comprising for each of multiple pixel locations an intensity or colour value, such as three intensity values for RGB, for example. The video data may have a resolution of full HD 1080p (1920×1080 pixels) or 4K (3840×2160 pixels), or other resolution. The video data comprises a sequence of images of the wall 102 over time at a frame rate (number of images per second) that is sufficient for tracking a falling rock, such that the distance travelled by the rock 101 between subsequent images is relatively small compared to the height of the wall 102. A frame rate of 60 Hz may be sufficient although high speed video with over 250 frames per second may yield more accurate results. Compression may be used but uncompressed video is preferable for accuracy. Processor 113 may register the video data with the radar data such that the pixels of the video data correspond to the same locations on wall 102 as the pixels of the radar data. This can be achieved using known relative orientations and viewing angle of video camera 104 and radar system 105.

The seismic data in the form of statistical mean x and standard deviation σ of estimated seismic source (impact) locations ($x_a$, $\sigma_a$), providing impact times and locations and, with suitable calibration, estimation of impact energies. Seismic sensor 106 may provide multiple detections of impact locations along the optical fibre and processor 113 may transform that information into a two- or three-dimensional coordinate based on the known location of the optical fibre. Again, the seismic data may be registered with the video data and radar data so that a single coordinate system can be used to access the data. Processor 113 may interpolate data where values are missing. The coordinate system may be Cartesian two-dimensional comprising x and y coordinates or three-dimensional comprising x, y and z coordinates. Polar coordinate systems and others are also possible.

Processor 113 also stores 202 spatial characterising data of the rock fall site. This may comprise three-dimensional data indicative of the spatial configuration of the rock fall site, such as wall 102, including slope and protrusions. In one example, the spatial characterising data comprises or is based on a geological model and Geographic Information Systems (GIS) data. This may provide material composition information for the source, such as the falling rock 101, of impact zone 110 and along the remainder of trajectory 103. This means, processor 113 may use the surface topography for prior knowledge on trajectory constraints. Further, processor 113 may use the geological model, geotechnical data and GIS data for source material composition estimation, impact zone material composition estimation, and inference for false positive mitigation. The spatial characterising data may further comprise a hydro-geological model including identification of weathered and fractured layers, and a defect database, characteristic spacing and orientations (identification of fragmented zones). Again, the spatial characterising data may be registered with the radar, video and seismic data to obtain a total data set with a single coordinate system.

Processor 113 estimates the rock fall trajectory 103 through the use of one or more fusion filters. The fusion filters may be extended Kalman Filters or similar filters. In one example, the filters are implemented using a cascaded approach, where the output from one filter feeds into a subsequent filter. In another example, the filters parameters and kinematic model may be modified based on the predicted state of the trajectory, such as bounce events. Calibration of the sensors may be performed, and in particular, the seismic sensor 106 may be calibrated using man-made seismic calibration shots or equivalent calibration measurements.

Source Location and Trigger

Figure 4:
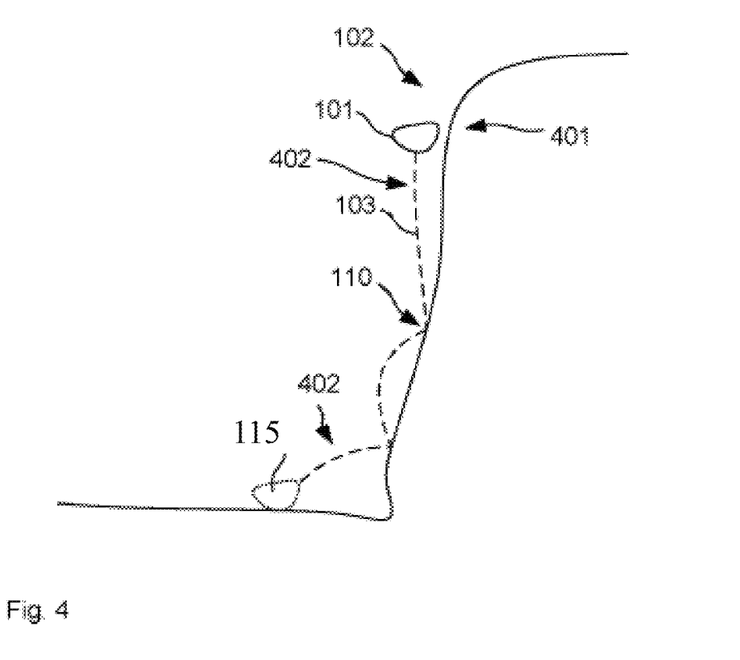
FIG. 4 illustrates the rock wall from FIG. 1 with added labels for the steps of the method from FIG. 2.

Returning to FIG. 2, processor 113 then detects 203 a source location of a rock fall based on the video data, radar data, and seismic data. The source location indicates the location where the rock was located before the rock fall event and then became dislodged and with a motion following trajectory 103. FIG. 4 illustrates the same rock wall 102 as in FIG. 1 with added labels for the steps of method 200 in FIG. 2. In particular, the source location of the rock fall event is indicated at 401.

In this example, system 100 has a first (un-triggered) state of relatively low activity, where system 100 monitors wall 102 for a likelihood of a rock fall. Once the likelihood reaches a predefined threshold, such as 10%, system 100 changes into a second (triggered) state of relatively high activity, where individual rock fall events are tracked. The trigger to change from first to second state may be provided by sensitive rock fall monitoring radar, seismic events or video. In order to determine the trigger, system 100 uses prior knowledge in the form of a rock fall hazard map, identifying regions of the slope believed to be more prone to rock fall events. The prior data can consist of a geological model, rock mass defect database, rock quality assessment data base and/or hazard database. System 100 may further perform contaminant source detection (machinery and personnel) based on multi-sensor detections inconsistent with the likely trajectory. Once the trigger is identified and system 100 changes into the second state, system 100 then acquires high frame rate video data of the rock fall event to accurately determine the location of the source of the rock fall event.

It is noted that without a rock fall event, the radar, video and seismic data typically shows little variation. However, once a rock becomes dislodged, this would show up as a sudden change in all of the video, radar and seismic data. While there may be little to no seismic effect from rock 101 heading away from wall 102, there are often small pieces or rocks associated with rock 101 which cause micro-seismic events. These can be detected in the seismic data to trigger system 100.

In summary, processor 113 triggers the steps of the method 200 based on a likelihood of detection of a source of a rock fall. The triggering is sensitive to the video data, radar depth data, and seismic data in the sense that processor 113 calculates a likelihood of a rock fall and triggers the execution of method 200 accordingly. In some examples, processor 113 captures low frame rate video data, such as 50 fps, before the triggering and capturing high frame rate video data, such as 250 fps, in response to the triggering False Positive Detection While the correct estimation of trajectory 103 has its benefits, there is also a downside if a rock fall event is falsely detected (false positive), since a detected rock fall often incurs costs, such as interruption of mining production, stopping of personnel, closure of areas, etc. Therefore, processor 113 reduces the probability of false detections by using stored data on geology/geotechnical models for material/strata identification, prior knowledge of physically feasible kinematics for rock fall events, and hazard maps for likelihood of false detection. For example, processor 113 may calculate a confidence level for a rock fall detection based on video, radar and seismic data. The rock fall event is then excluded, if it has a low confidence level and occurs in an area where the stored data indicates low likelihood of rock falls and the confidence of a rock fall event. On the other hand, an event with low confidence in an area with high likelihood triggers system 100 to track the fall and calculate trajectory 103.

That is, the triggering can use spatial adjustments for regions of the rock fall site. These spatial adjustments can be based on a geological model, rock mass defects, rock quality, or a hazard. So for example, if the rock wall 102 is characterised as a granite wall with little defects, the adjustment would be towards suppressing potential rock fall events until they are clearly indicated by the measured data. On the other hand, for weathered sedimentary rocks with many cracks and fault lines, the adjustment would be towards accepting potential rock falls even if the measured data only indicates a low likelihood.

Free Fall Estimation

Once the location of the source of the rock fall event is determined and system 100 is in the second, 'high alert' state, system 100 determines 204 a three-dimensional free fall estimation of the rock fall based on the source location 401. A period of free fall is indicated at 402 in FIG. 2. Free fall means inertial movement of rock 101 based on Newton's law caused by Earth's gravity with a potential initial velocity and without impact events on wall 102 or other objects. As a result, free fall does not cause seismic events and therefore, system 100 determines the three dimensional free fall kinematics based on radar data and video data only.

The three dimensional free fall kinematics may include a three-dimensional velocity vector and a three dimensional location vector, both of which are time dependent to represent the movement (location and velocity over time).

In one example, the radar provides line of sight (LOS) measurements and the vision system provides perpendicular to line of sight (PLOS) measurements which may be fused together with a Kalman filter, for example.

Kalman Filter

In one example, an adaptive filtering method, such as a Kalman filter, may be used as a motion model of the data processing algorithm in method 200.

A Kalman filter is a recursive data processing algorithm. It allows processing of all available measurements for estimation of the current variables being studied. The constraints for using a Kalman filter are sufficient for this demonstration, namely that the process (or motion) model be linear (unless the extended version of the filter is used), the process noise be Gaussian and white (constants spectral density). It is defined as $$x_t = A_t x_{t-1} + B_t u_t + w_t$$

where $A_t$ represents the state transition model which is applied to the previous state $B_t$ represents the control-input model and $w_t$ is the process noise defined as $$w_t \sim N(0, Q_t)$$

where Q represents the covariance of the process noise.

The system being modelled assumes a measurement model applies that describes how the sensor data relates to the state variables:

$$z_t = H x_t + v_t$$

where $z_t$ is the predicted measurement model after accounting for the estimated state and measurement noise $v_t \sim N(0, R_t)$ where R represents the covariance of the measurement noise.

Processor 113 applies a Kalman filter using the LOS signal, that is, the radar data, and the two components of the PLOS signal, that is, the image data. The filter and model may be modified to incorporate support for improved prediction of trajectories adjacent in time to bounce events as inferred from the micro-seismic monitoring or other systems, but this will be ignored for the current example. Let us define the system state as the true positional and velocity components, that is, the points or rocks in the video data and radar data.

In this method, the state is defined as $$x_t = [PLOS\text{true}_x PLOS\text{true}_y LOS\text{true} P\dot{LOS}_x P\dot{LOS}_y \dot{LOS}]$$

Measure $$z_t = PLOS\text{meas}_x PLOS\text{meas}_y LOS\text{meas}$$

(i.e. no velocity measurement) so $$H = [1\ 0]$$

Control input:

$$u_t = 0$$

so $$x_t = A_t z_{t-1} + w_t$$

With the above definitions processor 113 can perform the predict and update steps of the Kalman filter as follows where t is replaced by k:

Predicted (a priori) state estimate: $x_{k|k-1}=A_k\hat{x}_{k-1|k-1}+B_k u_k$

Predicted (a priori) estimate covariance $P_{k|k-1}=A_k P_{k-1|k-1} A_k^T+Q_k$

Measurement residual: $\tilde{y}_k=z_k-H_k\hat{x}_{k|k-1}$

Innovation (or residual) covariance $S_k=H_k P_{k|k-1} H_k^T+R_k$

Optimal Kalman gain $K_k=P_{k|k}H_k^T S_k^{-1}$

Updated (a posteriori) state estimate $\hat{x}_{k|k}=\hat{x}_{k|k-1}+K_k\tilde{y}_k$ Updated (a posteriori) estimate covariance $P_{k|k}=(I-K_k H_k)P_{k|k-1}$.

In one example, the values of the above matrices are determined based on library functions providing the Kalman filter, such as Python libraries pykalman, scipy, filterpy or Matlab Kalman class in the Control System Toolbox.

To summarise, the variable x holds data indicative of the images (PLOS) and radar (LOS) of rock 101 of wall 102 and the calculation of x is based on the video data and radar data represented by the variable z and also potentially the variable u. Further information can be found in international publication WO 2017/020077, which is incorporated herein by reference.

While examples herein relate to Kalman filters as motion models, other motion models are equally possible including look-ahead filters, exponentially-weighted moving average and moving average filters and other model-based filters, such as the dynamic data reconciliation (DDR) filter.

Bounce Kinematics

With the three-dimensional free fall kinematics at hand, processor 113 estimates three-dimensional bounce kinematics 205 of the rock fall. This estimation is based on the spatial characterising data of the rock fall site. That is, processor 113 models bounce kinematics and impact energy using prior knowledge (i.e. stored characterising data) of the surface topography and surface stratigraphy. For example, processor 113 uses the stored information as an indication of elasticity and "bounce off" from the wall 102. Processor 113 also uses the prediction from the 3D free fall kinematics described above, and micro-seismic event detection providing timing and location of bounce events. In other words, processor 113 has calculated the velocity and direction of rock 101 and the seismic sensor 106 now provides a location on the wall 102 where 101 has impacted the wall (indicated at 110). Processor 113 can use this information to retrieve topography and stratigraphy from memory for that location and calculate the direction and velocity of rock 101 after the impact with wall 102. Processor 113 can then add the result back into the Kalman filter described above to determine the three-dimensional location of the rock 101 after the bounce using radar and video data.

The determination of bounce kinematics may occur multiple times in cases where rock 101 impacts wall 102 multiple times. This means processor 113 calculates the bounce kinematics in the sense that processor 113 calculates the estimated velocity and direction after the bounce and adds the result back into the Kalman filter for the free fall until the next bounce. In that sense, the sequence of operation for processor 113 is an alternation of: source detection-free fall-bounce-free fall-bounce-etc.

Runout

Processor 113 can then estimate 206 a runout 402 based on the source location, free fall and bounce kinematics. The rock fall event typically results in material that finally comes to rest away from the wall after rolling or runout distance is achieved. This final location is provided by a filter using data from the vision and radar system, using prior knowledge of the ground topography, which reflects the understanding that depressions, protrusions, slopes etc. influence the runout of a rock.

Again, the runout often does not result in a significant reading from the seismic sensor 106, which is why seismic data may be of limited precision or even utility. The filter can be applied as described above by using a Kalman filter on the radar and video data and initialised with the data from the previous steps, such as the direction and velocity after the last bounce.

Trajectory

Finally, processor 113 combines 207 the source location, the three-dimensional free fall, the three dimensional bounce kinematics and the runout to determine the complete rock fall trajectory 103 from the source event 401 to the resting location 115. The trajectory 103 may be in the form of a sequence of locations and/or velocities or in a parameterised form, such as a spline representation.

The trajectory 103 can then be displayed is shown in FIG. 3 or used to determine intersections with travel paths of vehicles or other areas to automatically trigger risk mitigation actions, such as alerts, movement change or closure of areas as set out above.

Computer System

Figure 5:
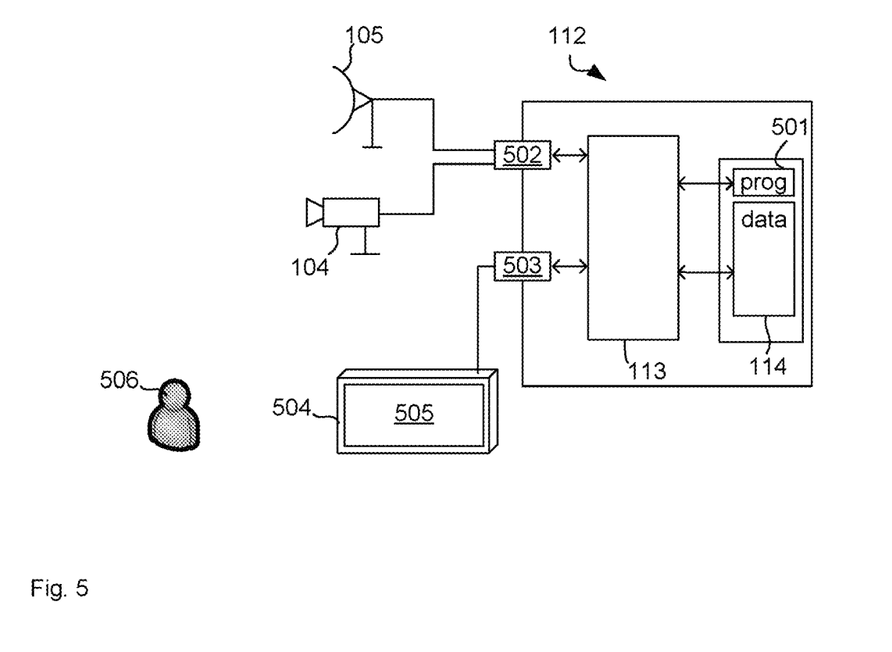
FIG. 5 illustrates computer system for monitoring rock falls.

FIG. 5 illustrates computer system 112 for monitoring rock falls on wall 102 in more detail. The computer system 112 comprises the processor 113 connected to data memory 114 as also shown in FIG. 1. Processor 113 is also connected to a program memory 501, a communication port 502 and a user port 503. The program memory 501 is a non-transitory computer readable medium, such as a hard drive, a solid state disk or CD-ROM. Software, that is, an executable program stored on program memory 501 causes the processor 113 to perform the method in FIG. 2, that is, processor 113 captures video, radar and seismic data of a rock fall site, stores spatial characterising data, detects a rock fall source, determines fall estimation and bounce kinematics, estimates runout and combines the result to determine the fall trajectory 103.

The processor 113 may then store the fall trajectory 103 on data store 114, such as on RAM or a processor register. Processor 113 may also send the determined trajectory via communication port 502 to a server, such as mine control centre.

The processor 113 may receive data, such as video, radar and seismic data, from data memory 114 as well as from the communications port 502 and the user port 503, which is connected to a display 504 that shows a visual representation 505 of the wall 102 to an operator 506. In one example, the processor 113 receives video data and radar data from video camera 104 or radar system 105 via communications port 502, such as by using a Wi-Fi network according to IEEE 802.11. The Wi-Fi network may be a decentralised ad-hoc network, such that no dedicated management infrastructure, such as a router, is required or a centralised network with a router or access point managing the network.

In one example, the processor 113 receives and processes the video data and radar data and performs appropriate pre-processing and cross-validation in real time. Similarly, seismic data is also received and processed by processor 113 in real time. If seismic data is processed with an independent software program on processor 113, the outputs may be cross-validated with the processed results obtained from the video data and radar data in real time. The processor 113 therefore determines the trajectory 113 every time image data or depth data is received from sensors 104, 105, 106 and completes this calculation before the sensors 104, 105, 106 send the next update. Processor 113 may either calculate the trajectory 103 for the past to indicate where rock 101 has fallen, or may also predict the remainder of trajectory 103 before rock 101 completes the fall.

Although communications port 502 and user port 503 are shown as distinct entities, it is to be understood that any kind of data port may be used to receive data, such as a network connection, a memory interface, a pin of the chip package of processor 113, or logical ports, such as IP sockets or parameters of functions stored on program memory 501 and executed by processor 113. These parameters may be stored on data memory 114 and may be handled by-value or by-reference, that is, as a pointer, in the source code.

The processor 113 may receive data through all these interfaces, which includes memory access of volatile memory, such as cache or RAM, or non-volatile memory, such as an optical disk drive, hard disk drive, storage server or cloud storage. The computer system 112 may further be implemented within a cloud computing environment, such as a managed group of interconnected servers hosting a dynamic number of virtual machines.

It is to be understood that any receiving step may be preceded by the processor 113 determining or computing the data that is later received. For example, the processor 113 determines video data or radar data and stores the video data or radar data in data memory 506, such as RAM or a processor register. The processor 113 then requests the data from the data memory 114, such as by providing a read signal together with a memory address. The data memory 114 provides the data as a voltage signal on a physical bit line and the processor 113 receives the image data or depth data via a memory interface.

It is to be understood that throughout this disclosure unless stated otherwise, locations, trajectories, times, and the like refer to data structures, which are physically stored on data memory 114 or processed by processor 113. Further, for the sake of brevity when reference is made to particular variable names, such as "point in time" or "movement" this is to be understood to refer to values of variables stored as physical data in computer system 112.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method for analysing rock falls, the method comprising:
    capturing video data, obtained by a video camera, from a rock fall site, the video data comprising a sequence of images of the rock fall site;
    capturing depth data, obtained by a depth sensor, from the rock fall site;
    capturing seismic data, obtained by a seismic sensor, from the rock fall site indicative of vibrations at multiple sensor locations;
    storing in computer memory spatial characterising data of the rock fall site;
    upon detecting of a rock fall within the rock fall site, triggering the steps, performed by a processor, of:
        (a) determining based on (i) the video data obtained by the video camera, (ii) the depth data obtained by the depth sensor, and (iii) the seismic data obtained by the seismic sensor, that are synchronized in time, a rock fall source location of a rock fall;
        (b) determining a three-dimensional free fall estimation of the rock fall, based on the rock fall source location determined in the step (a), by determining a time-dependent velocity vector and a time dependent location vector using a motion model;
        (c) estimating, based on the three-dimensional free fall estimation determined in the step (b) and the spatial characterising data of the rock fall site, three-dimensional bounce kinematics of the rock fall after an impact, and revising the three-dimensional free fall estimation based on the estimated three-dimensional bounce kinematics;
        (d) estimating a runout by applying a filter on the rock fall source location determined in the step (a), the free fall estimation determined in the step (b) and the bounce kinematics estimated in the step (c);
        (e) determining, by using one or more fusion filters, a rock fall trajectory, based on a combination of the rock fall source location determined in the step (a), the three-dimensional free fall estimation determined in the step (b), the three-dimensional bounce kinematics estimated in the step (c), and the runout estimated in the step (d); and
        (f) determining, based on the rock fall trajectory determined in the step (e), an area that has an associated likelihood of being affected by the rock falls,
    the processor completing the steps (a)-(f) before impact in the area determined to have an associated likelihood of being affected by the rock falls.

2. The method of claim 1, wherein the method further comprises triggering the steps of the method based on a likelihood of detection of a rock fall source of a rock fall.

3. The method of claim 2, wherein the triggering is sensitive to video data, depth data, and seismic data.

4. The method of claim 2, wherein the method further comprises capturing low frame rate video data before the triggering and capturing high frame rate video data in response to the triggering.

5. The method of claim 2, wherein the triggering uses spatial adjustments for regions of the rock fall site.

6. The method of claim 5, wherein the spatial adjustments are based on one or more of: a geological model, a rock mass defect, rock quality, and a hazard.

7. The method of claim 1, wherein estimating the three-dimensional free fall comprises fusing line of sight data from the depth data and perpendicular to line of sight data from the video data.

8. The method of claim 1, wherein the spatial characteristics comprise one or more of: surface topography, and surface stratigraphy.

9. The method of claim 1, wherein determining the three-dimensional bounce kinematics is performed in response to detecting a rock impact based on the seismic data.

10. The method of claim 9, wherein
    detecting the rock impact comprises determining an impact location of the rock impact, and
    estimating the three-dimensional bounce kinematics is based on the spatial characterising data at the impact location.

11. The method of claim 9, wherein determining the rock fall trajectory comprises:
    determining rock fall motion based on the video data and the radar data used in a motion estimation method, and
    updating the motion estimation method in response to detecting the rock impact with the three-dimensional bounce kinematics.

12. The method of claim 11, wherein the motion estimation method is based on a Kalman filter.

13. The method of claim 9, wherein the method comprises alternating between:
determining the three-dimensional free fall estimation,
detecting an impact event,
estimating three-dimensional bounce kinematics, and
determining a further three dimensional free fall estimation based on the three-dimensional bounce kinematics.

14. The method of claim 1, wherein estimating the runout is based on ground topography.

15. The method of claim 1, wherein the method further comprises initiating a mitigation action for a location in response to determining that the trajectory of the rock fall impacts the location.

16. The method of claim 15, wherein the mitigation action comprises one or more of an alarm and vehicle control.

17. A system for analysing rock falls, the system comprising:
a video camera to capture video data of a rock fall site, the video data comprising a sequence of images of the rock fall site;
a depth measurement system to capture depth data of the rock fall site indicative of vibrations at multiple sensor locations;
a seismic sensor to capture seismic data of the rock fall site,
the video data, the depth data and the seismic data being synchronized in time;
a data store to store spatial characterising data of the rock fall site;
a processor configured to perform, upon detecting of a rock fall within the rock fall site, a method including the steps of:
(a) determining, based on the video data captured by the video camera, the depth data captured by the depth sensor, and the seismic data captured by the seismic sensor, that are synchronized in time, a rock fall source location of a rock fall;
(b) determining a three-dimensional free fall estimation of the rock fall, based on the rock fall source location determined in the step (a), by determining a time-dependent velocity vector and a time-dependent location vector using a motion model;
(c) estimating three-dimensional bounce kinematics of the rock fall after an impact, based on the three-dimensional free fall estimation determined in the step (b) and the spatial characterising data of the rock fall site and revising the three-dimensional free fall estimation based on the estimated three-dimensional bounce kinematics;
(d) estimating a runout by applying a filter on the rock fall source location determined in the step (a), the free fall estimation determine in the step (b) and the bounce kinematics determined in the step (c);
(e) determining, by using one or more fusion filters, a rock fall trajectory, based on a combination of the rock fall source location determined in the step (a), the three-dimensional free fall estimation determined in the step (b), the three-dimensional bounce kinematics estimated in the step (c), and the runout estimated in the step (d); and
(f) determining, based on the rock fall trajectory determined in the step (e), an area that has an associated likelihood of being affected by the rock falls,
the processor completing the steps (a)-(f) before impact in the area determined to have an associated likelihood of being affected by the rock falls.

18. The system of claim 17, wherein the depth measurement system is a radar system or a range finder system.

19. The system of claim 17, wherein the depth measurement system defines a line of sight and the video camera is configured to capture image data in a plane that is perpendicular to the line of sight.

20. The system of claim 17, wherein the seismic sensor is a fibre-optic sensor comprising an optical fibre.

* * * * *